United States Patent

[11] 3,602,213

| [72] | Inventors | William L. Howell |
| | | Washington, D.C.; |
| | | William B. Leaf, Silver Spring, Md. |
| [21] | Appl. No. | 705,209 |
| [22] | Filed | Feb. 13, 1968 |
| [45] | Patented | Aug. 31, 1971 |
| [73] | Assignee | Prototypes, Inc. |
| | | Kensington, Md. |

[54] APPARATUS FOR PHOTOELECTRIC DERMACHROMOGRAPHY
11 Claims, 13 Drawing Figs.

[52] U.S. Cl. .................................................. 128/2.05 F,
128/2.05 P, 250/227
[51] Int. Cl. ............................................. A61b 5/02
[50] Field of Search ........................................ 128/2.05 P,
2.05 R, 2.05 NC, 2.05 F, 2.05 PR, 2.05 T;
250/217, 227, 239

[56] References Cited
UNITED STATES PATENTS

| 3,130,317 | 4/1964 | Connelly et al. | 250/227 |
| 3,313,945 | 4/1967 | Clinton | 250/227 X |
| 2,838,683 | 6/1958 | Munro | 250/227 |
| 3,040,737 | 6/1962 | Kompelien et al. | 128/2.05 (P.R.) |
| 3,167,658 | 1/1965 | Richter | 128/205 (P) X |
| 3,228,391 | 1/1966 | Fitter et al. | 128/2.05 (T) |
| 3,361,128 | 1/1968 | Colman | 128/2.05 (P) |
| 3,462,605 | 8/1969 | Engeler | 250/217 (SI) UX |

*Primary Examiner*—Anton O. Oechsle
*Attorney*—Peck & Peck

ABSTRACT: A method and apparatus for detecting occlusions in one of the internal carotid arteries by the differential sensing of epidermal blood flow in the supraorbital areas. A pair of photoelectric transducers that sense the relative absorption or reflection of light by the blood at the surface of the skin as an indication of blood flow are positioned over the supraorbital notches above the eyes. The blood contributions to these areas from the superficial temporal, angular and occipital arteries are eliminated by compression, leaving the internal carotids as the only suppliers. The sensor outputs are then compared, and any unbalance indicates an occlusion in one of the carotid arteries. Same may also be detected by momentarily compressing the supraorbital areas as well, and then comparing the refilling curves produced by the sensors. The location of the occlusion above or below the carotid bifurcation may be determined by removing all compression and repositioning the transducers to sense the external carotid flows.

PATENTED AUG 31 1971 3,602,213

INVENTORS
William L. Howell
William B. Leaf

BY
Peck & Peck
ATTORNEYS

INVENTORS
William P. Howell
William B. Doy

BY Peck & Peck
ATTORNEYS

INVENTORS
WILLIAM H. HOWELL
WILLIAM B. LEAF

BY Peck & Peck
ATTORNEYS

INVENTORS
WILLIAM L. HOWELL
WILLIAM B. LEAF

BY  *Peck & Peck*

ATTORNEYS

APPARATUS FOR PHOTOELECTRIC DERMACHROMOGRAPHY

This invention relates broadly to the art of Photoelectric dermachromography, and in its more specific aspects it relates to an apparatus and techniques of use which, among other applications, is employed for indicating the flow of blood in the capillary or arterial bed of the skin, and also for producing fine grain examinations of the pulsations of the blood in the arterial and capillary system; and the nature and objects of the invention will be readily recognized and understood by those skilled in the arts to which it relates in the light of the following explanation and detailed description of the accompanying drawings illustrating what we at present believe to be preferred embodiments or mechanical expressions of our invention from among various other forms, arrangements, combinations and constructions, of which the invention is capable within the spirit and scope thereof.

Blood flow to tissue rather than blood content is actually the significant factor which is detected by out apparatus. The variations in blood flow to tissue represent a dynamic change with each pulse produced by the heartbeat. For instance, a rapid flow of blood may be estimated by amplitude (a sudden increase in blood content) with each heartbeat or pulse. As this description proceeds, it will be evident that if an artery is partially obstructed the amplitude of the pulse beyond the obstruction will be diminished thereby indicating a reduced blood flow.

In many diseases to which the human body is subjected, it has been found that the flow of blood in certain areas of the skin is impeded so that such areas either contain substantially no blood at all, or have a reduced blood content. It is one of our primary purposes to provide an apparatus which graphically indicates and records, by electronic means, the differential blood flow to the skin in various related body areas. When such differential blood flow exists, this fact indicates to the examining physician, or technician, that, one or more obstructions are present in the arterial system, to thereby reduce or impede the flow of blood to that area of the skin which is deficient in its blood flow, and is being tested. Our innovation advances beyond the mere indication of the existence of an obstruction, for the examining physician may, determine where such obstruction is located, due to the position at which the apparatus is applied to the skin of the patient and by isolation of artery branches by manual occlusion of adjacent branches by pressure.

As an example, from among many, of diseases which may result from and be caused by an impediment to the normal flow of blood are:

1. Carotid occlusive disease (obstruction of arteries supplying the brain)
2. Arteriosclerosis Obliterans (obstruction of the arteries supplying the legs)
3. Thrombophlebitis (obstruction of veins by blood clots, etc.)

In all of the above-mentioned diseases, and in certain others, the basic cause is normally a deficiency in blood flow indicating that obstructions are present in the blood flow system to thereby impede the proper and normal flow of blood.

When the symptoms of the patient suggest to the physician that there are blood deficient areas which are caused by the aforesaid obstructions, there are several tests and techniques now being used to indicate that such a blood deficiency is present.

For instance, in the diagnosis of carotid occlusive disease with unilateral partial obstruction of one or the other internal carotid artery, the examining physician may perform what is termed Opthalmodynanometry. This test is conducted by beaming a magnified ray of light on the eye of the patient and simultaneously applying pressure against the eyeball which forces the blood out of the veins, whereupon the examining physician releases the pressure and then observes the rate of filling of the veins. In this test it is the speed with which the veins are refilled with blood that is the significant factor, and it will be evident, that the test which is based on the rate of refilling of the veins, depends considerably on the skill of the physician so that the human element is definitely present when this particular test is being practiced. We might point out that this test has not proved to be too successful.

It is also more or less common practice in determining blood flow deficiencies to use a stethoscope, and if there actually is an obstruction, a noise or bruit may be produced. Again, it will be appreciated that this test depends in considerable measure upon the skill and experience of the examining physician.

It is also known to determine the presence or absence of blood by measuring the temperature in the supraorbital area of the head of the patient. This test is known as infrared thermography.

An X-ray test has also been employed in attempts to discover and determine blood vessel obstruction. In performing this test a radiopaque substance is injected into the artery and then X-rays are taken. This test is not without danger, and is time consuming and highly technical.

From these examples of present day methods of testing patients to determine blood vessel obstruction or relative reduction of blood flow to selected areas, it will be recognized that each of them requires the exercise of considerable skill by the examining physician, and also involves the unpredictable human element in determining rates of refilling of veins, interpreting noises in a stethoscope, and the like.

It has been one of out major objects in devising this innovation to produce instrumentation and methods, by which the relative blood flow to different areas of the skin may be detected and then visually indicated and recorded, and such indication will be provided without the exercise of any unusual skills, and substantially eliminates the human error element in using the apparatus. As a matter of fact, after practice, a technician may use our apparatus satisfactorily, without requiring the services of a physician.

As one example, from among many, of the use to which our Photoelectric dermachromography apparatus and method may be put is to ascertain whether an obstruction is present in the common carotid or internal carotid artery so that elective surgery may be performed. Obstruction of the external carotid supplying the face and scalp is not clinically significant.

The human arterial system includes a pair of arteries which pass up the neck and supply the head. In man, the artery on the left side of the neck arises from the arch of the aorta, while that on the right side of the neck arises by the bifurcation of the innominate artery. These arteries pass upwardly and each divides into two branches. Each trunk or artery previous to division is called the "common carotid" and the branches are the "external carotid" which supplies the face, tongue, and external parts of the head, while the other branch is termed the "internal carotid" and supplies the brain, eyes, etc.

We have found that by the utilization of a pair of our instruments or transducers, at properly spaced positions on the supraorbital area, and practicing our methods, we may determine a relative deficiency of blood flow to one or the other small branches of the internal carotid arteries, so that one of the pair of transducers will detect this relative deficiency in blood flow. When a pair of spaced apart transducers is used, each is independent of the other, but ideally would be recorded simultaneously. As will become apparent as this description proceeds, each transducer and its system is balanced so as to respond equally to equal changes in light stimulus.

The skin of the supraorbital area receives a portion of its blood supply from branches of these two major arteries. Small branches of the internal carotid pass through small openings in the skull in the supraorbital region and also in the paranasal region.

In using a pair of transducers on the supraorbital region we place each transducer in position slightly above the aforesaid small openings in the skull. This positioning of the transducers may be accomplished with facility, due to the fact that the openings may be located by pressure of the fingers on the supraorbital region.

The significance of the use of the pair of transducers on the supraorbital region resides in the results which are obtained which indicate the differences in the proportion of blood flow to the right and left supraorbital areas, to thereby indicate that an obstruction is present in either the common or internal carotid arteries on the ipselateral side of reduced blood flow. If transducers are placed elsewhere on the forehead where blood flow is by way of the external carotid artery and reduced blood flow is shown on the same side it would follow that the common carotid (below the bifurcation) is obstructed or less likely that internal and external carotid arteries are separately obstructed.

Our innovation broadly involves the concept of a transducer, or a pair of transducers, adapted to be applied to an area, or areas, of the skin to indicate the presence or absence of blood therein or the relative amount of blood flow to the skin of one particular area with respect to a related skin area. The transducer broadly comprises a light source for directing rays of light into the skin for reflection therefrom back into the transducer depending upon the amount of blood present, and such reflected light is beamed to a photosensitive resistor which detects the amount of light reflected, and the signals produced by the transducer are transmitted through circuitry and a recorder for graphic indication and permanent record of the relative blood content of the skin.

It will be appreciated, by one skilled in the art, that it is essential, for a true indication of blood flow to be indicated by an apparatus of this character, that it be applied to the skin area without pressure thereon which might restrict blood flow and thereby produce a false reading. Thus, the use of straps, and the like, to removably fasten the apparatus to the skin of the patient is impractical, due to the fact that the use of straps, or the like, would result in pressure on the skin area with resultant possible pressure on the blood carrying vessels of the patient to thereby artificially restrict the flow of blood.

As we have stated above, the broad operational concept of our apparatus involves the beaming of light rays to the skin and reflection therefrom of such rays to the photosensitive resistor of the transducer. It will be recognized that for the proper operation of the device it is necessary that there be no obstruction to the travel of the rays from the skin to the photosensitive resistor. Thus, in our means for removably attaching the transducer to the skin, we have made certain that no such obstruction to light travel will occur.

We have successfully evolved a simple and effective means for removably attaching the apparatus or transducer to the skin of the patient, without applying any deforming pressure to the skin blood-carrying vessel area upon which the transducer is applied, and also have obviated any possibility of introducing a reflected light obstruction which would prevent the reflected light from being transmitted to and reaching the photosensitive resistor.

The means which we have devised for effectively removably securing the transducer to the skin is inexpensive and may be easily applied to the transducer by the examining physician or technician who is conducting the test, and is transparent for free and unobstructed travel of the reflected light to the photosensitive resistor.

Our apparatus may be operated by both DC and AC current. When DC current is used color (which is indicative of the blood flow) is measured by the DC current, and this constitutes a quantitative change and involves low amplitude, slow paper speed in the recorder and the overall changes in color are indicated by the reflected light therefrom. The AC current records pulses with a higher amplitude and the blood flow is estimated by the amplitude of the pulses.

In the design of our transducer a substantial number of problems, beyond those we have mentioned, were encountered which have been successfully overcome. For instance, it was desirable to provide a compact and easily usable unit, and to produce such unit at the lowest possible cost. These, and other, aims have been accomplished, and we have provided a unitary transducer formed of a combination of elements which are endowed with lasting qualities under normal use conditions.

In order to provide accurate indications of blood flow wherein a reflecting light concept is employed, it is necessary that the transducer provide means to keep external light from being transmitted to and from effecting the photosensitive resistor, and to only permit the reflected light from the skin to reach the photosensitive transistor. This object has been achieved in our apparatus, as all external light is prevented from reaching the photosensitive resistor.

Broadly, the epidermis is formed of two layers, (1) the stratum corneum of epidermis and, (2) the malpighian layer of epidermis, the latter having blood vessels in it so that it is necessary in the use of our transducer, to expose the photosensitive resistor to the reflected light rays from the layer of sin designated by the numeral 2 above, and to prevent the transmission of reflected light from the outer layer designated above by the numeral 1, since reflected light from this outer layer would not give an indication of the blood flow in the skin.

In an ingenious and novel manner, we have structurally related the various elements of the transducer so as to prevent the reflected light from the outer layer 1 from being transmitted to and effecting the resistance of the photosensitive resistor to thereby produce a true indication of blood flow content.

It is also within our contemplation to provide an apparatus which is structurally different from the apparatus briefly described above, but does not depart from the functional concept thereof and produces generally similar results. With this modified form of apparatus we are enabled to determine blood flow in larger skin areas to thereby produce unusually accurate findings. This form of our apparatus generally comprises an opaque tape, band, or the like, upon which are positioned a plurality of light sensitive elements having electric leads connected thereto, and a light source and an optical system are used for directing the rays of light from said light source to particular skin areas for reflection of said rays in varying degrees, dependent upon the flow of blood in such areas of the skin, back to the light sensitive elements to thereby detect and by means of circuitry and a recorder to graphically indicate and record the flow of blood in such skin areas.

This modified form of our apparatus is also removably attached to the skin by simple means which will not apply any deforming pressure to the skin blood-carrying vessel area to which the device is removably attached.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompany drawings.

Figures 1, 2, 3, 4, 5:
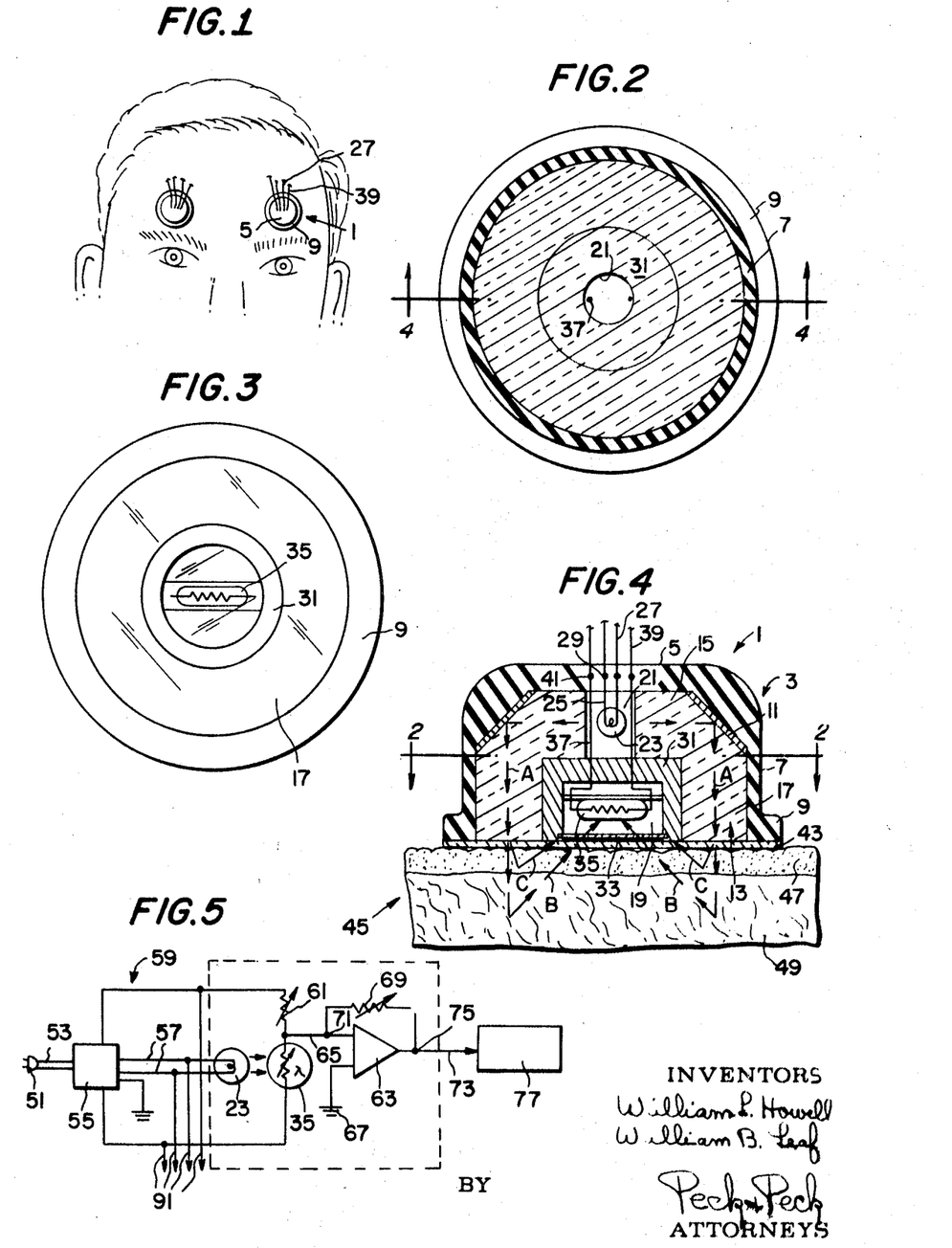
FIG. 1 is a front elevational view with parts thereof broken away illustrating a pair of our transducers positioned in spaced relation on the supraorbital areas of a subject, so as to indicate differential blood flow between the two spaced areas to thereby signify whether an obstruction is present in either the common carotid or internal carotid artery.
FIG. 2 is a view taken on line 2—2 of FIG. 4.
FIG. 3 is a bottom plan view of the transducer.
FIG. 4 is a view taken on line 4—4 of FIG. 2.
FIG. 5 is a schematic diagram of the circuitry employed to visually indicate and record the impulses transmitted by the transducer resulting from the light reflected from the skin, which, in turn depends upon the blood flow in the skin.

Referring to the drawings, the transducer 1 comprises an exterior housing 3 formed of an opaque material, such as black rubber, and having a cuplike configuration including a top portion 5, an annular skirt portion 7, and a radial flange 9 forming a light screen. The upper interior of the housing 3 carries an annular light reflector 11. Mounted within the housing 3 is a light pipe 13, such as Lucite, having a top body portion 15 and an annular skirt 17 terminating in the same horizontal plane as the flange 9. This configuration provides a central recess 19 in the light pipe which is open at its lower end.

The top body portion 15 of the light pipe is molded or otherwise formed to provide a centrally disposed opening or duct 21 therein and extending therethrough, which, at its lower end opens into recess 19 and extends upwardly through body portion 15 of the light pipe.

Positioned within the opening or duct 21, in the body portion of the light pipe, is a light source 23 having leads 25 which extend upwardly from their connection with the light source and into top 5 of the housing where they are suitably connected to power leads 27, as at 29. Consideration of the drawings indicates that the leads 25 and 27 are electrically connected together at 29 within the top 5 of the housing 3 in which they are molded. Positioned within the concentric recess 19 in the lower portion of the light pipe 13 is a photoelectric resistor or sensor casing 31 which is preferably, through not necessarily, formed of aluminum or the like light reflecting material. The photoelectric resistor casing 31 is secured by adhesive, or in any other suitable manner, to the light pipe 13. The photoelectric resistor casing 31 is formed with an open lower end which is closed by means of a transparent window 33, so that light rays may pass therethrough. Operatively positioned within the casing 31 is a photoelectric resistor 35, which may be a cadmium sulfide photoelectric resistor, which is sensitive to light stimulus. Leads 37 connected to the resistor 35 extend through the top of the casing 31 and through the duct 21 and into the top 5 of the housing 3 where they are connected to power leads 39, as at 41. As in the case of the light source leads 25 and 27, the connections for the leads 37 and 39 are molded within the top 5 of the housing 3. This feature of the leads and the power leads and their connections being molded within the housing 3, provides an effective method of protecting such leads and electrical connections during use of the transducer.

Referring particularly to FIG. 4 of the drawings, wherein we have illustrated one of our transducers applied to a skin area by means of a transparent adhesive or the like 43, which is applied by a brush, or in any other suitable manner, to the lower surface of the foot or base 9 of the skirt 7, to the lower surface of the annular depending skirt or portion 17 of the light pipe 13 and to the lower annular surface of the resistor casing 31. Thus, with the transparent adhesive applied, in any suitable manner, to the lower surface of the transducer, as just described, it will be recognized that the transducer may be removably attached to the skin, and when so attached no pressure or other force which might adversely effect blood carrying vessels therein is applied to the skin.

It will be evident that this transparent and light transmitting adhesive coating is easy to apply and is inexpensive.

It is also within our contemplation to use a transfer tape having adhesive to each side thereof for removably securing the transducer to the skin. It will be evident that when such tape is used, for this purpose, one adhesive side thereof will be adhesively secured to the transducer while the other adhesive side will be adhesively secured to the skin. It is to be understood that such tape means for removably attaching a transducer to the skin falls within the spirit and scope of our invention.

In FIG. 4 of the drawings I have used the numeral 45 to designate the skin, and the skin comprises two layers, an exterior layer 47 and an interior layer 49. These two skin layers 47 and 49 are known as the epidermis, the exterior layer 47 being termed the stratum corneum of epidermis and layer 49 being termed the malpighian layer of epidermis, and it is this latter or interior layer that has blood vessels in it, and it is our purpose to provide means embodied in the transducer whereby light reflected from the interior layer 49 will be transmitted to, and stimulate the resistor to transmit varying signals, to thereby indicate the blood flow in this interior layer of skin 49 beneath the transducer.

In FIG. 5 of the drawings we have illustrated one form, from among many, of the circuitry which may be used to receive the signals produced by the photoelectric resistor and to graphically indicate and record the flow of blood in a particular area of the skin being tested, as detected by the photoelectric resistor. Either AC or DC current may be used in this circuitry for graphically and permanently indicating blood flow. DC current is particularly applicable to measure and indicate the color of the skin area which is under test, such color, of course, being indicative of the blood flow. As we have stated above, not only does our apparatus measure color of a skin area being tested, but also records pulses, and the blood flow is estimated by the amplitude of the pulses, and when the amplitude of the pulses is being measured, AC or DC current is used, but AC is preferably as the use thereof allows for the automatic centering of the graphic indication on the tape by automatic means well known in the art.

The circuitry is fed from any suitable power source by means of an electric plug 51 having leads 53 extending therefrom into any suitable regulated power supply 55. The light source 23 is connected by leads 57 with the regulated power supply 55, and the photoelectric resistor 35 is connected in a bridge circuit designated generally by the reference numeral 59, and one arm of this circuitry includes a variable resistor 61 which functions as a balance. An operational amplifier 63 is connected by a conductor 65 to the bridge circuit between the variable resistor 61 and the photoelectric resistor 35, the other side of the amplifier 63 being grounded as at 67. A variable resistor 69 in parallel with the amplifier 63 is connected to conductor 65 as at 71 and to the output 73 at 75. The output 73 feeds to an oscilloscope or transcribing recorder 77.

The transducer being caused to removably adhere the skin, as illustrated in FIG. 4 of the drawings, and when the light source 23 is energized, light rays A will pass from the light source through the body portion 15 of the light pipe 30, and will be transmitted to the reflecting media 11 for the deflection of said light rays to and through the annular depending skirt 17 of the light pipe 13 and from such skirt through the transparent adhesive material 43 and into the two layers of skin 47 and 49. Since the photoelectric resistor casing 31 is formed of light reflecting or deflecting material, any light rays from the light source 23 which may impinge upon the exterior surface of the casing 31 will be deflected back into the light pipe for transmission therethrough and into the skin. Light may be conducted to the skin in circumferentially spaced pints, if desired.

The light rays A which are transmitted to the interior layer of skin 49, which carries the blood vessels, will be reflected from such layer of skin outwardly, as at B, and through the window 33 and to the photoelectric resistor 35, for stimulation thereof to transmit a signal according to the amount of light reflected from the blood within the skin 49. The light reflected from the blood-carrying vessels in the skin layer 49 into the transducer and to the photoelectric resistor disposed therein will be modulated by the amount of blood flow within the skin area being tested. Since blood absorbs light, it will be appreciated that the aggregate of light reflected by the blood to the photoelectric resistor is dependent upon the blood flow in the skin area being tested. Thus, the signals produced and transmitted by the photoelectric resistor to the circuit is variable depending upon the blood flow in the skin area under test.

It is to be understood that light of a selected wavelength enters the skin peripherally and equidistant from the photoelectric resistor so that changes in resistance may be graphically presented on an oscilloscope or multichannel transcribing recorder. It is significant that our transducer construction is such that the light is directed to the skin peripherally of and equidistant with respect to the photoelectric resistor, since this insures that the resistor will be properly stimulated in conformity with the blood flow to the skin or tissue.

It is highly desirable to prevent stimulation of the photoelectric resistor by any light rays passing out of the light pipe which may be reflected from the exterior layer 47 of the skin, rather than the interior layer 49, since this skin layer 47 does not have any substantial blood flow therein, so such rays directed from skin layer 47 to the photoelectric resistor would produce an undesirable and false reading. We have so designed our transducer that it is not possible for any such rays, which we shall term "early rays," from being reflected from the exterior skin layer 47 to the photoelectric resistor. Such unwanted rays are designated in FIG. 4 of the drawings by the letter C, and consideration of this drawing indicates that such light rays from the outer layer of skin 47 will impinge upon the lower surface of casing 31 and will not have access to the recess 19 to thereby stimulate and effect the photoelectric resistor.

The base or foot 9 of the housing 3, the lower edge of which is covered with adhesive and adheringly abuts against the skin when the transducer is in operative position as illustrated in FIG. 4, functions not only to receive the adhesive 43, but also functions as a light screen to prevent outside light from reaching the photoelectric resistor 35 in any manner whatsoever. It will be fully appreciated that when the transducer is removably attached to the skin it is essential for its proper operation that the only light which reaches the photoelectric resistor be that which is reflected from the light source 23 by the skin layer 49 in which are the blood-carrying vessels.

In FIG. 1 of the drawings we have illustrated the use of a pair of transducers which are applied in spaced relation to the supraorbital area, and by the use of a pair of transducers, as shown in FIG. 1, the examining physician or technician may determine the differences in the proportion of blood flow to the right and left supraorbital areas, and from this indication, and then with the application of manual pressures, as will be described, it will be suggested that there is an obstruction present either in the common carotid or in the internal carotid.

When a pair of transducers is being used to determine relatively differences in blood flow between different areas of the skin as illustrated in FIG. 1, each transducer has its own circuitry, one of which is illustrated in FIG. 5 of the drawings. Referring again to FIG. 5 of the drawings, the leads designated by the numeral 91 supply regulated power for a second channel for one of the pair of transducers. Thus, it will be appreciated that such other or second channel comprises the same circuitry as illustrated in FIG. 5. Using a pair of transducers, as illustrated in FIG. 1, each is independent of the other, but is recorded simultaneously. Each transducer of a pair of transducers and its system or circuitry is balanced so as to respond equally to equal changes in light stimulus.

Figure 6:
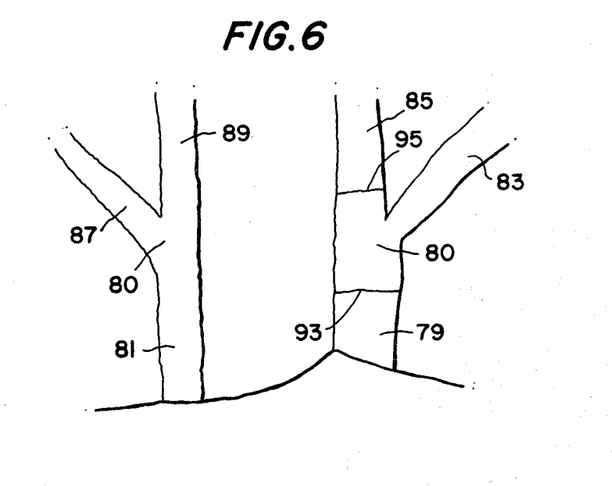
FIG. 6 is a schematic illustration of the right and left common carotids and the internal and external carotids which are connected to a common carotid, the arteries being enlarged.

In FIG. 6 of the drawings we have schematically illustrated the left and right common carotids in order to make crystal clear the practice of the methods which we shall hereinafter describe.

In this figure of the drawings we have used the numerals 79 and 81 to designate the left and right common carotids, respectively. Each such common carotid has a bifurcation 80 from which extends the left external carotid 83 and the left internal carotid 85, and with respect to the right common carotid the internal carotid 87 extends from the bifurcation 80 while the internal carotid 89 extends from this bifurcation. In the left common carotid, for purposes of illustration, we have shown an occlusion 93 below the bifurcation 80 and an occlusion 95 above the bifurcation 80.

The subject or patient to be examined is placed in a supine position with head elevated 15° to 20°. Experience has shown that this is an optimum position since pulse wave amplification is increased by rapid venous emptying as the head is elevated. When the subject or patient has been positioned as outlined above a pair of transducers 1 are positioned in spaced-apart relationship on the supraorbital area as illustrated in FIG. 1 of the drawings. It is preferable that each transducer be centered with respect to each eye and slightly above the eyebrow of each eye. The openings in the skull are approximately where the transducers are positioned, and the blood flow through these openings is from terminal branches of the internal carotid.

With transducers so positioned and the electric circuit energized with sufficient amplification to detect pulse waves, a reading is obtained from each transducer which reading will, by virtue of wave amplitude, indicate the relative blood flow to each supraorbital skin area. Such flow may be not only that from supraorbital arteries but also from the superficial temporal arteries, the angular arteries and the occipital arteries. Contributions from these other arteries may be estimated and eliminated in the following manner:

Following the obtaining of the above-mentioned readings a band is placed around the head of the patient to thereby occlude the occipital arteries. When the band has been so placed a further reading from each transducer will be taken and this will likely indicate a reduced blood flow. Following the taking of this second reading the examining physician applies a clamp with pressure points just anterior to the ear tragi to occlude the superficial temporal arteries, and when this clamp has been applied a further reading from each transducer will be taken and this will likely indicate a further reduced blood flow. Following this third reading the angular arteries are occluded by means of clamp compression of either side of the nose at the level in the interior canthi of the eyes. (It should be noted that it is not significant whether the superficial temporal or the angular arteries is first occluded.) Thus the resulting readings or pulse amplitudes after the elimination of contributions from the occipital, superficial, temporal and angular arteries are representative of flow through the supraorbital arteries alone. Proof may be had by elimination of pulse waves by the application of pressure over supraorbital notches.

Figure 9:
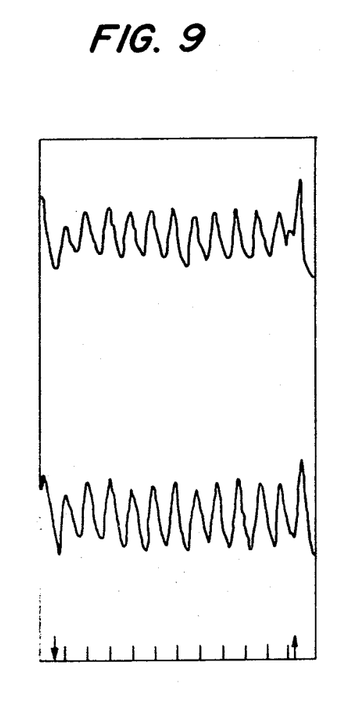
FIG. 9 is a tracing illustrating the reductions is amplitude.

Referring particularly to FIG. 9 of the drawings, the upper and lower tracings are made from the right and left supraorbital skin areas respectively. At the point of the downward directed arrow the superficial temporal arteries are compressed on each side simultaneously. The arrow which is directed upwardly marks the time of release of such pressure. Consideration of this figure of the drawings indicates that the amplitude of the waves in the upper tracing during compression is lower than those in the lower tracing during compression. Thus, the waves between the two arrows represent the pulse waves recorded from the terminal branches of the internal carotid after contributions of blood from the superficial temporal arteries has been eliminated.

Estimation of blood flow through the supraorbital branches may be made at this pint in still another manner. At low amplification and slow paper speed (5 cm. per sec.) half-time refilling may be estimated by momentary compression of supraorbital branches. The curve of refilling has proved to be exponential, subtending a straight line when plotted on semilog paper.

In this method of determining whether there is an imbalance between the right and left supraorbital areas in the rate of refilling a momentary compression of the supraorbital branches may be made by pressure applied by the examining physician or by momentary pressure on the transducers to produce resultant pressure on the supraorbital areas.

Figure 11:
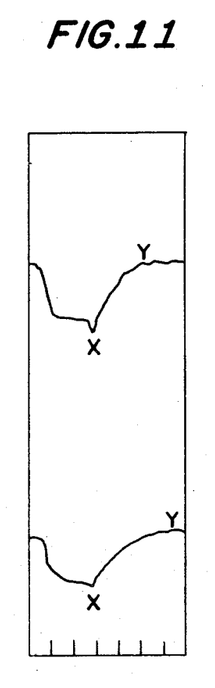
FIG. 11 is a tracing illustrating veno capillary refilling.

Referring particularly to FIG. 11 of the drawings and with the transducers in place on the right and left supraorbital skin areas which are represented on the tracing above and below respectively, when pressure is applied to the transducers simultaneously there is a depression in the base line as illustrated in this figure. With the release of the pressure the refilling time of the tissues with blood is recorded. Consideration of this figure indicates that there is a slight delay in reaching the base line in the lower tracing indicating a slight retardation of blood flow through the left supraorbital area. The significant refilling time element is indicated in this tracing from the points X which are the points of release of pressure to the base line Y.

Figure 10:
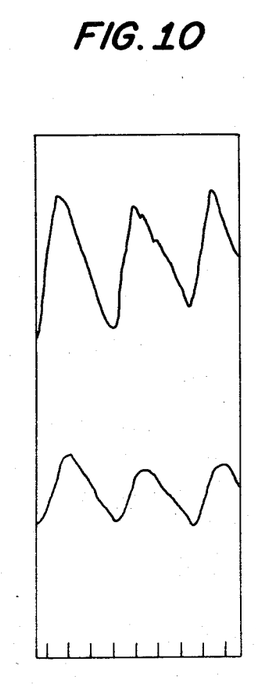
FIG. 10 is a tracing illustrating pulse wave velocity.

Another manner in which the comparison between blood supply in skin areas may be accomplished is illustrated in the tracing of FIG. 10 which graphically indicates pulse wave velocity.

In this figure the top tracing is taken from the right supraorbital temporal area thus being a pulse wave on the external carotid. The lower tracing which is taken simultaneously is recorded from the left supraorbital area. In the case of the lower tracing the collateral flow from the superficial temporal artery on that side has been eliminated by compression, thus the lower wave represents blood flow through the left internal carotid. Consideration of this figure of the drawings indicates that the peak or nadir of the pulse waves in the lower tracing are delayed as compared to the peak or nadir of the pulse waves in the upper tracing. The explanation for the delay is that there is some obstruction to blood flow through the internal carotid in the left side.

Localization of stenosis or obstruction above or below the bifurcation of the common carotid artery may be done in the following manner:

Let us assume that there is an indication of such imbalance for the rate of refilling of the left internal carotid 85 is reduced relative to the rate of refilling of the right internal carotid 89. When such imbalance is indicated the various compression means, mentioned above are removed from the patient.

When the transducers have made this indication it suggests that there is an obstruction or a partial obstruction 93 in the common carotid 79 below the bifurcation 80, or there is an obstruction 95 in the internal carotid 85. At higher amplification the amplitude of pulse waves may be compared. Thus, when this imbalance occurs the transducers 1 are moved from the position illustrated in FIG. 1 to a position which is slightly higher and lateral with respect thereto and additional readings are taken. If this additional reading indicates that there is no imbalance in blood flow between the external carotids 83 and 87, such reading suggests that there is an obstruction, or a partial obstruction 95 in the internal carotid 85, but that there is no obstruction, or partial obstruction 93 in the common carotid 79 below the bifurcation 80. In the event that this reading, with the transducers moved as described, indicates an imbalance between the external carotids 83 and 87 with reduced amplitude on ipselateral side, this result will suggest, as will be apparent, that an obstruction, or partial obstruction, 93 is present in the common carotid 79 below the bifurcation 80.

It will therefore be recognized that by this method it is not only possible to indicate imbalance in blood flow but it is also possible to obtain a suggestion as to where an obstruction or a partial obstruction may be.

In persons approximately 50 years of age, or older, the flow of blood in the arteries and veins is substantially reduced relative to persons in lower age brackets. When this occurs it is well known that such a reduced blood supply to tissues stimulates the development of collateral blood supplies and with this in mind we have devised a method of indicating whether or not a significant portion of blood supply to the supraorbital areas flows from one or more collaterals rather than from a carotid.

In practicing this method, particularly on subjects who are approximately 50 years of age or over, sensors are placed at various locations on the supraorbital area by any of the means hereinabove described. The collateral arteries are then compressed and if there is a significant reduction in wave amplitude resulting from such artery compression, this indicates and suggests that a significant portion of blood supply to underlying skin is through the collaterals which were compressed, when a significant reduction of wave amplitude occurred, rather than through a carotid. Thus, if the sensors indicate this substantial reduction in wave amplitude, this suggests occlusion of the carotid on the ipselateral side.

Following the above steps which render a suggestion that one of the carotids is occluded, and since what is to be determined is the relative flow of blood by the two internal carotids, the procedure is then as follows:

While compressing the collateral vessels eliminating their contribution of blood to the skin in the supraorbital area, estimates are then made of the blood flow to the skin in each supraorbital area, comparing one with the other. This is done by placing the transducers in the manner as generally illustrated in FIG. 1. The comparison may be done in one of the following several manners:

1. Provided the transducers are balanced, a reduction in wave amplitude on one side indicates partial obstruction to blood flow on that side. (See FIG. 9)
2. To determine the rate of venal capillary refilling, the transducers are positioned as set forth above in (1), and the collaterals are compressed. While employing DC current at low amplitude the transducers rest against the skin thus eliminating blood from it, or causing pallor. Pressure on the transducers is released quickly and simultaneously, recording a curve of refilling. (See FIG. 11)
3. In this manner of comparison pulse recordings are made simultaneously as in (1) above. When there is no occlusion the pulse waves peak simultaneously. If there is an occlusion or partial obstruction the peak of the pulse waves on that side will be delayed. (See FIG. 10)

A further method which we may follow in obtaining a suggestion that there is an occlusion, or a partial occlusion in either the right or left common carotid is to successively compress the common carotids while taking readings of the signals transmitted by the transducers during the compression operation. In following this method the transducers are placed in position on the supraorbital areas as indicated in FIG. 1 of the drawings, whereupon either the right or the left common caroitd is compressed. As an example, the left common carotid may be first be compressed at a point below the bifurcation 80 therein (see FIG 6 of the drawings). While the left common carotid is compressed a simultaneous reading is taken on the two oscilloscopes of the signals transmitted by the two transducers. Following this reading the compression of the left common carotid is released, whereupon the right common carotid is compressed at a point below the bifurcation 80. A further simultaneous reading is taken while the right common carotid is compressed. If the two readings indicate an imbalance between the supply of blood to the area beneath either the right or left transducer there is, of course, a suggestion of an occlusion or a partial occlusion being present in one of the common carotids. Thus, as an example, let us assume that the oscilloscope readings indicate a reduced supply of blood to the left transducer when the right common carotid is compressed; this suggests the presence of an occlusion, or a partial occlusion, in the left common carotid. Conversely, if the two readings indicate a reduced supply of blood to the right transducer when the left common carotid is compressed, this suggests an occlusion or a partial occlusion in the right common carotid.

In order to ascertain whether the occlusion, or partial occlusion, which has been suggested in a common carotid is above or below the bifurcation 80, the method described above is followed, wherein the transducers 1 are moved from the position illustrated in FIG. 1 to a position which is slightly higher and lateral with respect thereto and additional readings are taken.

Figure 12:
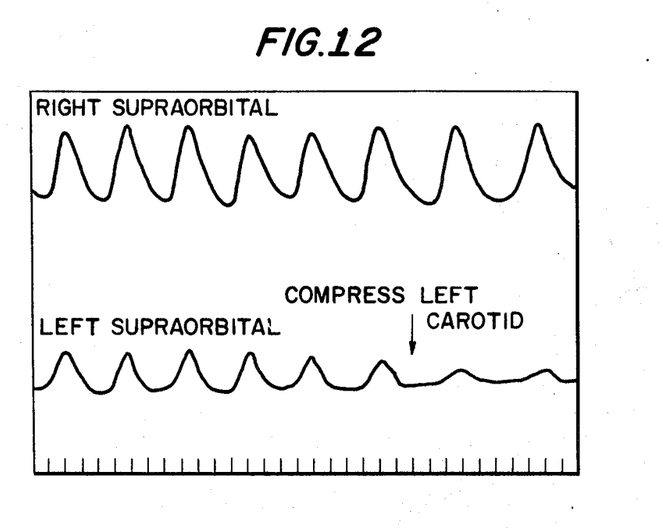
FIG. 12 is a tracing illustrating the results from the compression of the left common carotid.
Figure 13:
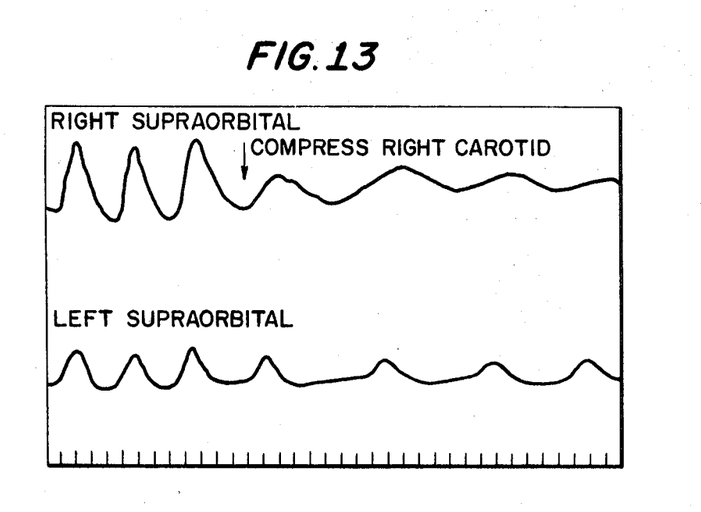
FIG. 13 is a tracing illustrating the results from the compression of the right common carotid.

In FIGS. 12 and 13 we have illustrated the tracings resulting from the compression of the left common carotid and the compression of the right common carotid, respectively, and it will be seen from these tracings that, in the subject being tested, there is an occlusion or a partial occlusion in the left common carotid, for the reason that the supply of blood which would normally flow through the left common carotid, when the right common carotid is compressed is substantially reduced as shown by the tracing of the left common carotid.

Figure 7:
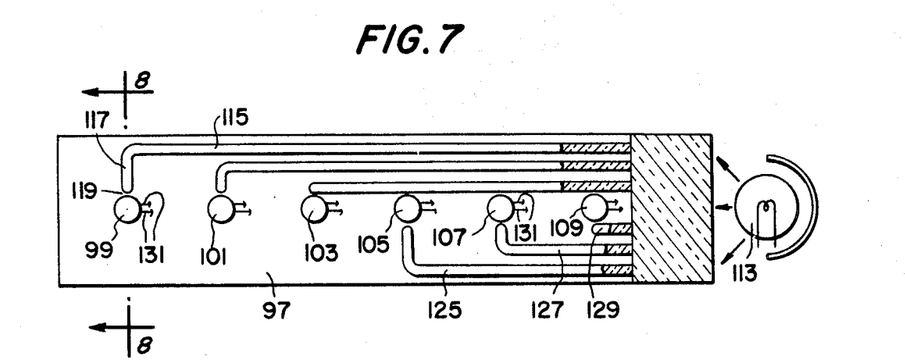
FIG. 7 is a top plan view of a modified form of our invention utilizing an opaque tape upon which are mounted a plurality of spaced apart sensors or photoelectric resistors.
Figure 8:
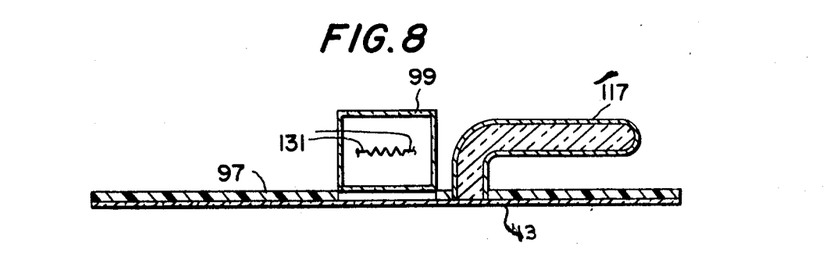
FIG. 8 is a view taken on line 8—8 of FIG. 7.

In FIGS. 7 and 8 of the drawings we have disclosed a further form of apparatus by means of which our inventive concept, as described above, may be carried out. Generally, this further form of our invention comprises a flexible opaque tape which mounts thereon a plurality of sensors, or photoelectric resistors, the tape being adapted to be removably secured to the skin so that the sensors will be subjected to the stimulus of light reflected from the skin or tissue. The tape carries an optical system whereby light from a light source is directed to the skin area adjacent each of said plurality of sensors or photoelectric resistors.

In this form of our invention we provide an opaque tape 97 which may be of any length suitable for the purposes for which it is to be used. The under, or what we shall term the "operative" surface of the tape is covered with any suitable transparent adhesive 98 so that the tape may be removably applied and caused to adhere to the skin at the desired area thereon. The transparent adhesive may be of the type described above for removably causing the transducer 1 to adhere to the skin's surface.

Mounted in any suitable manner in longitudinally spaced relation on the tape 97 are a plurality of photoelectric resistors or sensors 99, 101, 103, 105, 107 and 109. While we have disclosed, merely by way of example, six of such sensors it is to be distinctly understood that more or less than six of these light sensitive elements may be provided. The sensors 99-109 are mounted on and nd fixed to the upper surface of the opaque tape 97, and in order for the sensors to be stimulated by light reflected from the skin we provide a transparent area on the tape directly below each sensor. This may be accomplished in any number of ways, for instance, windows or the like may be provided in the tape below each sensor, the tape may be transparent in these areas, or small circular cutouts in the tape may be provided.

At one end of the tape 97 is mounted, in any suitable manner, a plexiglass, lucite, or the like, light collecting and transmitting medium 111, and this light collecting and transmitting medium functions generally in the manner of a light receiving and projecting manifold which receives light from a light source 113.

In order to transmit and conduct the light, which is gathered in the manifold 111, to each skin area beneath each sensor for the reflection of light rays from the skin to the sensor we have provided an optical system which is mounted on and carried by the tape. Such optical system consists of a conducting means comprising a series of light pipes, one being provided for each skin area below each sensor, and each such light conducting pipe comprises a flexible light-conducting optical fiber means which extends from the manifold 111 along the tape and to a light emitting end adjacent each sensor, so that the light from each such pipe will be directed into the skin area below each sensor. A flexible fiber light pipe 115 extends from the manifold 111 along the tape to a point adjacent and in transverse alignment with the sensor 99 and is bent at 117 to bend the light rays being conducted thereby toward the sensor 99 whereupon, the pipe is again bent downwardly as at 119 to direct the light rays onto the skin area beneath the sensor 99. It will be understood that the angling of the light emitting end of the light pipe 115 will be such that the exhausting light rays will impinge upon the skin area below the sensor 99, and it will be further recognized that the tape 97 at the point where the end 119 of each light pipe is positioned is either cut out or transparent so that such exhausting light rays may be directed to and impinge upon the skin area below the sensor 99. A flexible fiber light pipe 121 directs light to the skin area below the sensor 101 and a further flexible fiber light pipe 123 directs light to the skin area below the sensor 103. Similarly, a light pipe 125 directs light to the skin area below the sensor 105 while a further light pipe 127 directs light to the skin area below the sensor 107 and another light pipe 129 directs light to the skin area below the sensor 109. As will be apparent from consideration of the drawings, the lengths of the plurality of flexible fiber light pipes varies, and, of course, this is due to the varying distances between each sensor and the manifold 111. With this length exception, all of the light pipes are of the same construction as the light pipe 115 and its forward portion 117 and 119, so that it will not be now necessary to individually structurally describe each light pipe 121-129. The light pipes are characterized by their ability to receive light at one end, and to bend the light, without any substantial radial or lateral deviation.

The light pipes 115-129 and their end portions 117 and 119 are suitably attached to the tape 97 so that they will maintain their proper operative positions with respect thereto, and each emitting end of each light pipe is equidistant from each sensor. The light source 113 may be mounted on the tape or on the manifold in spaced relation thereto, as shown in FIG. 7 of the drawings, or it may be manually held in the proper position for directing light to the manifold 111. Since the tape and the light pipes are flexible, they will conform to the curvature of the body part to which the tape is applied.

Each sensor 99-109 is provided with leads 131 for connecting each such sensor into a circuit including a regulated power source means for amplification, and an oscilloscope, or the like, as illustrated in FIG. 5 of the drawings. It will be understood, and will be explained hereinafter, that each sensor may be successively connected into a circuit similarly to that shown in FIG. 5, in a manner well understood by one skilled in the art.

It is well known that anatomically there are substantial variations in people, so that the skull openings, which we have discussed above, from the branches of the internal carotid may be in different positions in different people. In view of this anatomical variation, the tape-type transducer which we have developed is particularly useful since it obviates the necessity for definitely locating the positions of the above mentioned skull openings. This is the fact for the reason that each tape 97 is provided with a plurality of longitudinally spaced sensors so that when a tape is applied to the supraorbital region above and centered with respect to each eye and just above the eyebrow, one of the sensors will be in the proper position with respect to the skull openings. Thus, substantial time is saved and the technique of application is simplified.

A tape is applied to the right supraorbital area and one is applied to tee left supraorbital area, and it is to be understood that each tape of the pair of tapes is preferably of the same construction.

When the tapes have been applied in the manner suggested above, a sensor on one tape is connected into its electric circuit and a sensor on the other tape is connected into its electric circuit, for simultaneous readings from each sensor. When these simultaneous readings from the two sensors have been made another pair of sensors on the separate tapes are employed for securing further readings and this paired operation is continued until readings have been obtained from each sensor of each tape, it being understood that in this operation readings are taken simultaneously from a pair of sensors.

In the selection of each pair of sensors to be stimulated simultaneously for simultaneous readings, we pair the sensors according to their positions on each tape, thus the sensors which are paired are equidistant from the midline of the forehead.

In using the tape type transducers substantially the same method is followed that is practiced when the transducers 1 are being used, as has been described above. For instance, the pair of tape transducers is applied to tee supraorbital area, one being applied to the right supraorbital area and the other being applied to the left supraorbital area. A reading is then taken from the paired sensors as we have described above, and when these readings are completed the occlusion of the various arteries is then done step by step as we have described in connection with the transducers in FIG. 1. The method continues in exactly the same manner as described above with respect to the method practiced when using the the transducers 1.

While we have described in detail the use of our apparatus and method on the supraorbital areas, it is to be distinctly understood that we may determine blood flow and obtain suggestions of venous obstructions and arterial obstructions in areas other than the supraorbital.

For example, if there is a clinical indication of occluded blood flow in the veins of a leg this may be estimated by the use of the apparatus of this invention. When there is such an indication the subject is placed in a sitting position and then is placed in a reclining position and feet elevated so that the blood will flow out of the feet and the feet will become pale. Prior to laying the patient down, a transducer, of either the form illustrated in FIG. 1 of the drawings or the tape or band illustrated in FIG. 7 of the drawings is applied to the top of each foot and, as will be appreciated, when the patient is lying down and feet elevated the feet should become pale due to the flow of blood therefrom through the veins. If there is an obstruction, or a partial obstruction, in the veins of a leg, the foot of that leg will be slower to become pale than the other foot, since the blood will flow out of that foot at a slower rate than it flows out of the other foot due to the obstruction, or partial obstruction, in the veins. From this the examining physician will obtain a suggestion of an obstruction, or partial obstruction, in the veins of the leg having the foot which becomes pale at a relatively slower rate than does the other foot.

Let us assume that there is a clinical indication of an occlusion in an artery of the leg so that the examining physician desires to measure the relative arterial flow in the legs. A transducer, of either the form illustrated in FIG. 1 of the drawings or the tape or band-type illustrated in FIG. 7 of the drawings is applied to the top of each foot, and, of course, each transducer is connected into the circuitry as illustrated in FIG. 5 of the drawings. The examining physician then elevates each leg so that the blood therein will flow toward the heart after which the legs of the patient are lowered. Readings are taken from each transducer and such readings will indicate the relative rates of refilling with blood of the areas beneath each transducer. This rate of refilling represents an index of the arterial flow, and the relative colors of the feet resulting from the differential blood flow will be detected by the transducers by means of the reflected light from the skin to the transducers. Thus, the relative color indication detected by the transducers, and graphically recorded, will suggest that an occlusion is present in the artery in the leg, the foot of which is the slowest to refill with blood, so that elective surgery may be performed.

It is within our contemplation to balance the bridge circuit, which is illustrated in FIG. 5, by means of varying the light intensity of the light source 23, instead of using the variable resistor 61 which is shown in the circuit of FIG. 5 and functions as a balance. In cases where a patient has a skin which is quite transparent less light from the light source is required to obtain the light reflections, and thus a dual result of balancing the bridge and reducing the light intensity is achieved in this manner.

We claim:

1. Apparatus for photoelectric dermachromography including, in combination, a transducer unit adapted to be removably attached to a skin area in which the blood flow is to be measured, means for removably attaching the transducer unit to a skin area which is pressureless with respect to the skin area and is operable to maintain said transducer removably fixed to the skin area and maintain said unit on the skin area preventing sliding movement with respect thereto, electric light sensitive means disposed in said transducer, a light source, and ringlike means in said transducer for conducting light rays from said light source to the skin annularly about said electric light sensitive means, said electric light sensitive means being disposed in said transducer in position therein in the path of light reflected from the skin area, and an electric circuit controlled by said electric light sensitive means.

2. Apparatus for photoelectric dermachromography in accordance with claim 1, wherein said means for removably attaching said transducer unit to a skin area comprises a transparent adhesive adapted to be removably fixed to the skin area and fixed to at least the lower surface of said ringlike means.

3. Apparatus for photoelectric dermachromography including, in combination, a transducer unit adapted to be removably attached to a skin area in which the blood flow is to be measured, electric light sensitive means disposed in said transducer, a light source, and a continuously annular ringlike means in said transducer conducting light rays from said light source to the skin in a continuously extending annulus about said light sensitive means, said light source being so positioned in said transducer unit relative to said ringlike means that light may be transmitted from said light source to the skin solely by said ringlike means, said electric light sensitive means being disposed in said transducer unit in position therein in the path of light reflected from the skin area, and an opaque housing of generally inverted cuplike form, and said light source, said ringlike means for directing light from said light source, and said electric light sensitive means are disposed in concentric relation in said housing, said ringlike means being provided with a body and an annular skirt depending therefrom, said body being provided with a duct extending therethrough and said light source being positioned in said duct and said electric light sensitive means being in position encompassed by said annular skirt, and further opaque means positioned between said light source and said electric light sensitive means for preventing light from said light source from directly impinging on said electric light sensitive means, said opaque housing comprising a top portion having an annular skirt depending therefrom, and said further opaque means comprises a reflective casing having an open lower side, and the lower annular edges of said annular skirt of the opaque housing and of the annular skirt of the ringlike means for conducting light, and the lower edge of said casing are in substantially the same horizontal plane, adhesive means applied to said lower edges for removably securing the transducer unit to the skin, and an electric circuit controlled by said electric light sensitive means.

4. Apparatus for photoelectric dermachromography including, in combination a transducer unit adapted to be removably attached to a skin area in which the blood flow is to be measured, electric light sensitive means disposed in said transducer, a light source, means in said transducer unit for conducting light from said light source to the skin area adjacent said electric light sensitive means, said electric light sensitive means being so positioned in said transducer relative to said means for conducting light that it is in position adapted to receive light reflected from the skin area, means for removably attaching said transducer unit to a skin area and said last-named means adapted to be positioned between the electric light sensitive means and the skin, and an electric circuit controlled by said electric light sensitive means.

5. Apparatus for photoelectric dermachromography according to claim 4, wherein said transducer unit comprises an opaque band having an operative surface adapted to be removably attached to a skin area in which the blood flow is to be measured, said light sensitive means comprising a plurality of spaced apart electric light sensitive means mounted on the other surface of said band, the band having areas beneath each light sensitive means for the passage of reflected light therethrough to a light sensitive means, said light conducting means comprising an optical system mounted on said other surface of said band for conducting light from said light source and emitting the light at a plurality of stations on said band, each of said stations of said plurality of stations being adjacent one electric light sensitive means, said band having areas adjacent each station of the optical system for transmission of light therefrom to the skin area beneath each electric light sensitive means for the reflection of said light from the skin to each electric light sensitive means, said electric circuit having means for detachably connecting each of said electric light sensitive means, serially, into said electric circuit, and said electric circuit being controlled by the electric light sensitive means which is connected into said circuit.

6. Apparatus for Photoelectric dermachromography in accordance with claim 5, wherein each of said stations is equally spaced from its respective electric light sensitive means.

7. Apparatus for Photoelectric dermachromography in accordance with claim 5, wherein said opaque band is flexible.

8. Apparatus for Photoelectric dermachromography in accordance with claim 5, wherein said electric light sensitive means are longitudinally spaced apart on said band.

9. Apparatus for Photoelectric dermachromography in accordance with claim 5, wherein said attaching means comprises a transparent adhesive adhered to the operative surface of said opaque band for removably attaching the band to the skin.

10. Apparatus for Photoelectric dermachromography in accordance with claim 5, wherein said optical system includes a manifold for gathering and transmitting light from said light source, and a plurality of light pipes each positioned to receive and conduct light from said manifold to a station adjacent an electric light sensitive means, there being a light pipe for each electric light sensitive means.

11. Apparatus for Photoelectric dermachromography in accordance with claim 10, wherein said light pipes are flexible.